(12) United States Patent
Harris

(10) Patent No.: US 7,282,185 B2
(45) Date of Patent: Oct. 16, 2007

(54) EMISSION CONTROL APPARATUS

(75) Inventor: Harold L. Harris, Cypress, TX (US)

(73) Assignee: Clean Air Power, Inc., San Diego, CA (US)

( * ) Notice: Subject to any disclaimer, the term of this patent is extended or adjusted under 35 U.S.C. 154(b) by 0 days.

(21) Appl. No.: 10/105,571

(22) Filed: Mar. 26, 2002

(65) Prior Publication Data

US 2002/0106312 A1 Aug. 8, 2002

Related U.S. Application Data

(63) Continuation-in-part of application No. 09/228,479, filed on Jan. 11, 1999, now abandoned.

(51) Int. Cl.
*B01D 53/34* (2006.01)
*F01N 3/28* (2006.01)

(52) U.S. Cl. ............... 422/181; 422/171; 422/177; 422/180; 181/249; 181/264

(58) Field of Classification Search ............. 422/171, 422/177, 180, 181; 181/248–249, 264
See application file for complete search history.

(56) References Cited

U.S. PATENT DOCUMENTS

| | | | | | |
|---|---|---|---|---|---|
| 3,771,315 A | * | 11/1973 | Scott | ............ | 181/260 |
| 3,899,303 A | * | 8/1975 | Gaysert | ............ | 422/176 |
| 4,579,194 A | * | 4/1986 | Shiki et al. | ............ | 422/176 |
| 5,016,438 A | * | 5/1991 | Harris | ............ | 422/180 |
| 5,043,147 A | * | 8/1991 | Knight | ............ | 422/180 |
| 5,921,079 A | * | 7/1999 | Harris | ............ | 422/177 |

* cited by examiner

*Primary Examiner*—Hien Tran
(74) *Attorney, Agent, or Firm*—Boyle Frederickson S.C.

(57) ABSTRACT

Apparatus for controlling emissions from an internal combustion engine including an enclosed housing one end of which is provided with an inlet and the other end an outlet. A coaxial tubular member extends from the inlet into the housing. A catalytic cell surrounds the tubular member and separates two chambers, a first surrounding the tubular member near the inlet and the other on the opposite side of the catalytic cell. Exhaust gases from the internal combustion engine flow through the tubular member, expanding into the other chamber, then through the catalytic cell for conversion of nitrogen oxides, carbon monoxide and unburned hydrocarbons to less noxious components, expanding into the first chamber for eventual discharge through the outlet.

14 Claims, 1 Drawing Sheet

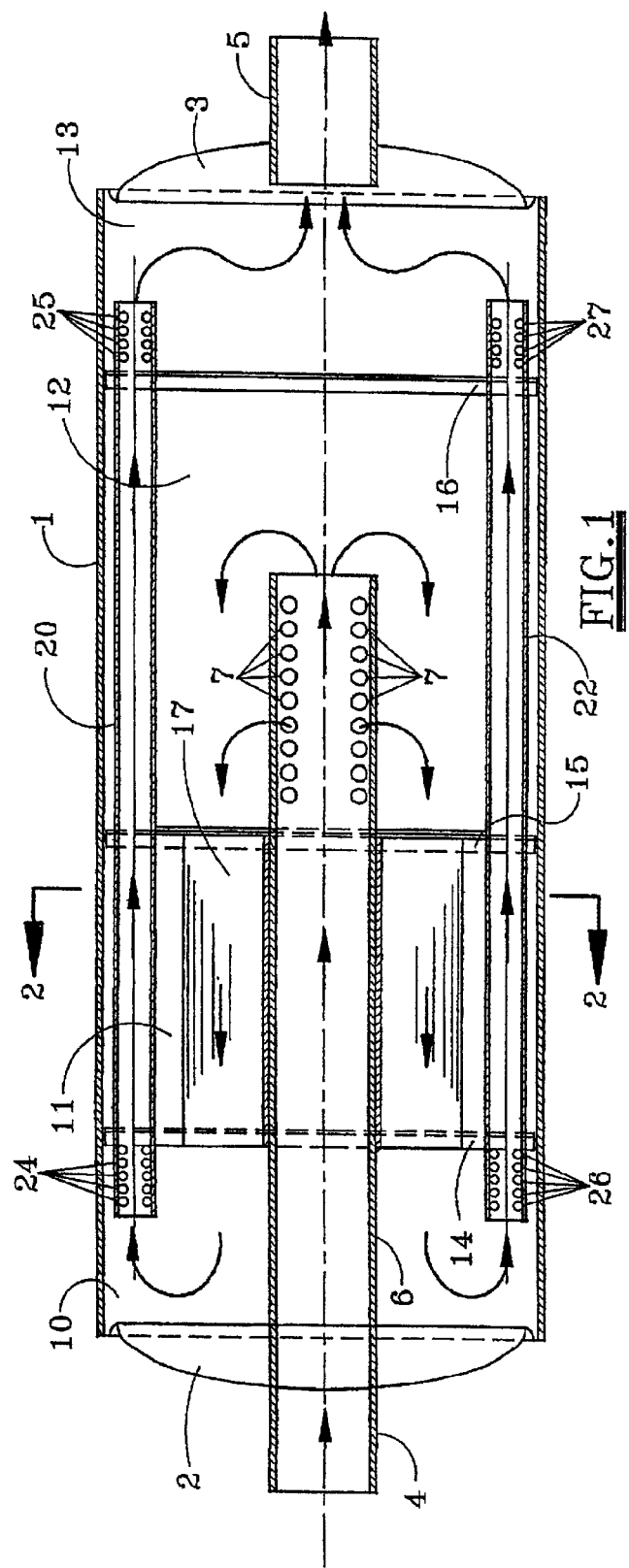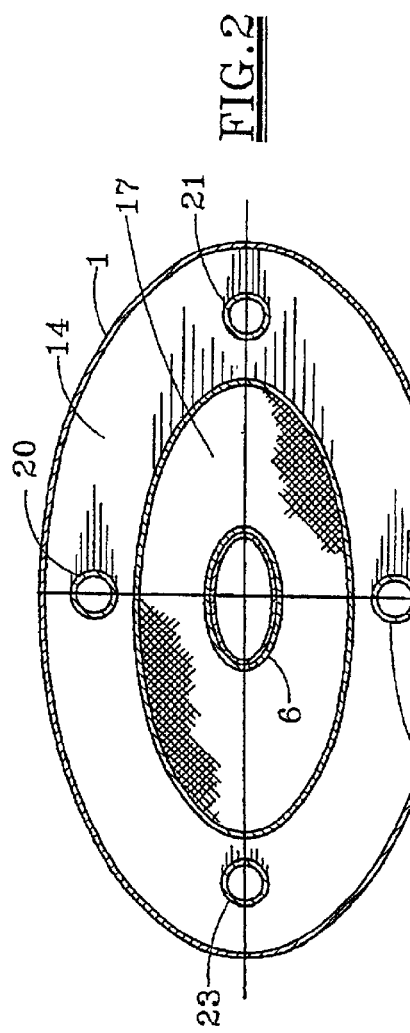

EMISSION CONTROL APPARATUS

CROSS-REFERENCE TO RELATED APPLICATION

The present application is a continuation-in-part of application Ser. No. 09/228,479 filed Jan. 11, 1999, now abandoned.

BACKGROUND OF THE INVENTION

1. Field of the Invention

The present invention pertains to apparatus for use with internal combustion engines to reduce emission of noxious gases and noise emitted therefrom. More specifically, the present invention pertains to apparatus, particularly suited for use with spark ignited, four cycle, carbureted or injected engines, for converting nitrogen oxides, carbon monoxides and unburned hydrocarbons from the exhaust of such engines to less noxious compounds and for reducing the noise emitted therefrom.

2. Brief Description of the Prior Art

Both noise and air pollution have been of increasing concern in recent years. Silencers or mufflers for noise reduction of internal combustion engines have existed for many years. Most silencers utilize some type of housing in which is mounted various types of baffles or other silencing components for reducing the noise produced at the exhaust of an internal combustion engine.

As early as 1957, automotive and industrial catalytic converters were being developed to reduce carbon monoxide and unburned hydrocarbons emitted from internal combustion engines. In these early designs, beads or pellets of catalyst were contained in a basket or cage to which exhaust gases were directed for radial flow (inwardly or outwardly). Such designs resulted in increased pressure drop, required frequent replacement of catalyst and required inspiration of atmospheric air to aid in oxidation of carbon monoxide and unburned hydrocarbons. Such a design is shown in U.S. Pat. No. 3,899,303.

In later emission designs, catalytic converters were developed in which a catalyst formulation was deposited on a monolithic substrate of extruded ceramic or metal corrugations to form a honeycomb type monolithic catalyst. Such a design is shown in U.S. Pat. No. 4,579,194. However, like the design of previously mentioned U.S. Pat. No. 3,899,303 this design also required inspiration of atmospheric air to aid in oxidation of carbon monoxide and unburned hydrocarbons. In such designs, exhaust gas flow can be interrupted or reversed through aspiration inlets should back pressure increase in the catalyst due to collection of particulates, backfires, etc. This would result in directing untreated, polluted exhaust gases to the atmosphere.

In early years of catalytic converter development, only carbon monoxide and unburned hydrocarbons were identified as smog producing pollutants. The catalyst used in early two-way catalytic converters, such as those heretofore mentioned, was a platinum formulation which required additional oxygen to support catalytic reaction. Thus these designs (U.S. Pat. Nos. 3,899,303 and 4,579,194) required induction of air.

There is now even more heightened concern for air pollution created by noxious gases emitted from the exhaust of an internal combustion engine, primarily carbon monoxides, other unburned hydrocarbons and more recently recognized nitrogen oxides. Catalytic converters have been developed through which the exhaust gases may be passed for converting the nitrogen oxides, carbon monoxide and unburned hydrocarbons to less noxious compounds before being discharged to the atmosphere. Such catalytic reactions require close control of air-fuel ratio and three-way catalytic converters using, for example, a formulation of platinum, palladium and rhodium. No outside introduction of air or oxygen is required or desired. Problems associated with three-way catalytic converters have been identified as: imprecise air/fuel ratio control, deactivation of the catalyst and flow maldistribution at the front area of the catalytic converter. The flow distribution problem is the one least improved and the one which holds most promise in increased efficiency and extended catalyst life.

Exhaust silencers and catalytic converters for internal combustion engines are governed by chemical, fluid flow, and acoustical characteristics. These characteristics interact with each other and when properly combined provide an efficient exhaust system for control of air and noise pollution.

Air pollution and noise abatement equipment may take many forms or configurations. For example, the engine may be provided only with a catalytic converter or with a catalytic converter first and then a silencer or with a silencer first and then a catalytic converter. In more recent years, catalytic converters and exhaust silencers have been combined in a single housing. See, for example, U.S. Pat. Nos. 5,016,438 and 5,921,079.

Especially in the manufacture of a combined catalytic converter and exhaust silencer, all three disciplines or characteristics (chemical, fluid flow and acoustical) must be considered and properly balanced. Exhaust silencing quality, emissions reduction efficiency, and engine efficiency all depend upon a proper combination.

As previously stated, one of the primary problems to consider in a combined catalytic converter and exhaust silencer, particularly for efficiency of catalytic conversion, is flow distribution. In recent years, research has been conducted to determine the velocity profile of exhaust gases entering the frontal area of the catalyst module of a catalytic converter. One such study has been reported in a paper entitled *Improvement of Catalytic Converters for Stationary Gas Engines by Using a Metal-Supported Catalyst*, Y. Tsurumachi and A. Fujiwara and Y. Yamada all of Tokyo Gas Co., Ltd. Tokyo, Japan. Another study is reported in *Chemical Engineering Science*, Vol. 44, No. 9, pp. 2075–2086, 1989 in an article entitled *Transient Operation of Monolith Catalytic Converters: a Two-Dimensional Reactor Model and the Effects of Radially Nonuniform Flow Distributions*. Research has produced evidence that exhaust gases entering a catalytic converter housing at high velocity concentrate in the center core of the catalytic converter module in a pattern substantially the same diameter and area as the inlet. Other results of research show that when a truncated conical inlet transition is provided exhaust gases recirculate around the transition causing flow maldistribution and scattered hot and cold spots in the frontal area of the catalyst module, reducing conversion efficiency.

Catalytic converters of relatively small frontal area result in increased impingement velocity and higher linear velocity through the catalyst depth. This creates higher back pressures, raising the mean effective pressure in the exhaust system between the catalytic converter and the engine exhaust valves. Undersized exhaust silencers can also increase the back pressure and when coupled with an undersized catalytic converter multiply the back pressure many times over, reducing operational efficiency of the engine.

Velocity control and pulsation dampening are products of capacity made possible by diameter and length. Diameter controls velocity and length controls expansion of exhaust gases to achieve design velocity and reduced pulsation level. In addition, staging pulsation (manifested as vibration and noise due to engine firing frequency) helps flow condition the exhaust gases upstream of the catalyst to assure even distribution of exhaust gases to the catalyst face.

From a chemical standpoint, residence time of exhaust gases through a catalyst module is important for catalytic reduction of toxic emissions. Research has determined that the linear velocity through the catalyst should be between 14 and 17 actual feet per second to provide optimum back pressure and residence time for conversion. In order to efficiently utilize the three characteristics or disciplines in the design of an internal combustion engine exhaust system, the catalytic converter module should be manufactured to accept exhaust gases at the prescribed velocity, maintaining linear velocity through the catalyst module depth while providing optimum residence and conversion therethrough.

Catalyst size and substrate material in proportion to mass flow and back pressure limits is also important in automobile applications of catalytic converters. Physical manufacture in keeping with good limits of mass production methods in the automotive muffler industry is also important.

SUMMARY OF THE PRESENT INVENTION

The present invention provides apparatus for controlling emissions from an internal combustion engine to reduce noxious gas emissions and to reduce noise therefrom. The apparatus may include an enclosed housing having an inlet at one end thereof for connection with the exhaust of an internal combustion engine and an outlet through which the exhaust gases may be discharged to the atmosphere. Both noise reduction means and noxious gas converter means may be disposed in the housing.

The converter means, coaxially mounted in the housing, is characterized by a catalytic module the center which is formed around a tubular member providing a honeycomb type catalytic cell of annular cross section the inner diameter of which is substantially the same as the outer diameter of the tubular member and the outer diameter of which is somewhat less than the inner diameter of the housing. Exhaust gases from the engine flow from the housing inlet through the tubular member into an expansion chamber then through the catalytic cell, where the nitrogen oxides, carbon monoxides and unburned carbons thereof are converted to less noxious compounds, and into at least one other expansion chamber before being discharged through the outlet. By preventing concentrated flow through the center of the catalytic cell and by redirecting flow from the expansion chamber through the larger diameter catalytic cell of annular cross section, exhaust gases through the catalytic cell are more evenly distributed and the velocity thereof is reduced, increasing the residence time and efficiency of conversion in the catalytic cell.

In preferred embodiments of the invention, the housing is divided by partitions into four chambers: a first chamber nearest the inlet, a second converter chamber in which the annular catalytic cell is disposed, a third chamber next to said converter chamber, and a fourth outlet chamber. A coaxial tubular member provides for flow of exhaust gases from the inlet into the third chamber where it expands, then through the converter chamber and into the first chamber, another expansion chamber. Additional tubular members provide for flow to the fourth chamber prior to discharge through the outlet. Tubular members of various sizes and dispositions may be provided with perforation to reduce pulsation and noise emitted from the engine exhaust. The catalytic module, being surrounded by and in contact with hot exhaust cases is subject to faster heating and hence reaches conversion efficiency at a faster rate.

In preferred embodiments for automobiles, the housing, and the coaxial tubular member are elliptical in cross-section. In such a design, catalytic cell is of elliptical annular cross-section.

Thus, the present invention provides for reduction of noxious gases and, in preferred embodiments, reduction of noise, in a unique combination especially characterized by better distribution of exhaust gas flow through the catalytic converter portion thereof. The combination provided by the emission control apparatus of the present invention is one which takes advantages of chemical, dynamic fluid flow and acoustic principles in a combination which results in superior reduction of noise and air pollution.

A primary feature of the present invention is the utilization of volume within the silencer to reduce velocity of the exhaust gasses and to provide best flow distribution at the catalyst face. The reduction of exhaust gas velocity at the catalyst face and the equal distribution of exhaust gasses across the catalyst face greatly reduces, if not completely eliminates, the concentration of high velocity at the catalyst face. The design also provides the ability to penetrate the catalyst substrate without fear of damage to catalyst surfaces. Penetration of the catalyst substrate allows a great deal of design flexibility to configure the converter/silencer to meet space limitation and to facilitate ease of manufacture. Many other objects and advantages of the invention will be apparent from the description which follows in conjunction with the accompanying drawings.

BRIEF DESCRIPTION OF THE DRAWINGS

FIG. 1 is a longitudinal view, in section, of noise and emission control apparatus according to a preferred embodiment of the invention; and FIG. 2 is a cross sectional view of the noise and emission control apparatus of FIG. 1 taken along lines 2—2 thereof.

DESCRIPTION OF PREFERRED EMBODIMENTS

Referring first to FIGS. 1 and 2, there is shown an apparatus for controlling emissions from an internal combustion engine. The apparatus is a combination noise and pollution control apparatus, particularly adapted for use with an automobile. It includes a cylindrical housing 1 closed at opposite ends by dished heads 2 and 3. The housing 1 can be cylindrical or, as in the preferred embodiment illustrated in FIGS. 1 and 2, of elliptical cross-section. If cylindrical, the heads 2 and 3 are semi-spherical. If elliptical, they are semi-elliptical in shape. The head 2 is provided with a single inlet 4 by which the apparatus may be connected to the exhaust (not shown) of an internal combustion engine (not shown). The opposite head 3 is provided with an outlet 5. The outlet 5 may be connected to a discharge pipe (not shown) or in the case of an automobile to the tailpipe (not shown). In the exemplary embodiment, the inlet 4 is formed by the end of a tubular member 6 which is coaxially disposed in the housing 1 and extends, uninterrupted, from the inlet well into the housing 1. The end of the tubular member opposite the inlet 4 is open and the walls thereof are perforated 7 allowing exhaust gases to enter or exit the tubular member therethrough.

In the preferred embodiment, the housing 1 is divided from one end toward the other into first, second, third and fourth chambers, 10, 11, 12 and 13, respectively, by first, second and third partitions or baffles 14, 15, 16, respectively. The first partition 14 may actually be a baffle with perforations or passages through the walls thereof. Partitions 15 and 16 are not perforated and seal chambers 12 and 13 from other chambers. A honeycomb type catalytic cell 17 surrounds the tubular member 6. The honeycomb catalytic cell is formed by depositing a suitable catalytic formulation on a ceramic or metallic substrate. In a preferred embodiment, the catalytic formulation is a three-way catalyst of platinum, palladium and rhodium. Gases, totally confined within tubular member 6 until entering the third chamber 12, expand and flow through the catalytic cell 17 into another expansion chamber, the first chamber 10. As the exhaust gases from the internal combustion engine flow through the catalytic cell, nitrogen oxides, carbon monoxide and unburned hydrocarbons are converted to less noxious components, without induction of additional air or oxygen as in prior designs. The catalytic cell 17 is annular in cross section. Actually, in the preferred embodiment shown in FIG'S. 1 and 2, the tubular member 6 is of elliptical cross-section and the catalytic cell is of coaxial elliptical annular cross-section.

One or more additional tubular members are disposed near outer walls of the housing 1 extending through the second and third chambers 11 and 12, providing for flow of exhaust gases, of less noxious components, from the first chamber 10 into the fourth chamber 13 for eventual discharge through the outlet 5. In the exemplary embodiment there are four such tubular members 20, 21, 22 and 23. The ends of the additional tubular members are open and the walls thereof may be perforated, as shown at 24, 25, 26 and 27 for reduction of noise as the less noxious exhaust gas compounds flow therethrough for eventual discharge through the outlet 5. Actually, the diameter and length of the tubular members 6, 20, 21, 22, 23 and the size and number of perforations 7, 24, 25, 26, 27 provided therein are selected to provide optimum noise reduction and uniform flow distribution of exhaust gases through the apparatus.

In operation, exhaust gases from an internal combustion engine flow uninterrupted through the inlet 4 and the tubular member 6 into the expansion or third chamber 12. Flow is then reversed as indicated by the arrows therein so that the exhaust gases spread out and then flow through the catalytic module or cell 17 into the first chamber 10. As the exhaust gases flow through the catalytic module 17, nitrogen oxides, carbon monoxide and unburned hydrocarbons are converted (three-way catalyst) to less noxious compounds without addition of air or oxygen as in prior art two-way catalyst designs.

From the first chamber 10, the exhaust gases, now of less noxious compounds, flow through the tubular members 20, 21, 22, 23 into the fourth chamber 13 and are eventually discharged through outlet 5 to the atmosphere or for further handling. The arrows in FIG. 1 indicate the travel of the exhaust gases from the inlet 4 to the outlet 5.

As the exhaust gases flow from the tubular member 6 into the chamber 12, they flow out the end of the tubular member 6 and through the perforations 7 spreading out for more even distribution and flow at reduced velocities through the catalyst or catalytic cell 17. The particular arrangement, in which the catalytic cell 17 is of annular or semi-elliptical annular cross-section, also results in more even distribution and flow at reduced velocities, resulting in increased converter residence time, increased life of catalyst and greater efficiency in reducing noxious exhaust gases to less noxious gases.

The emission control apparatus of the present invention also provides, in unique combination, noise reduction components. In its elliptical cross-sectional construction as illustrated in FIGS. 1 and 2, the apparatus is particularly adapted for use for catalytic conversion and noise reduction for an automobile. The apparatus is relatively simple in construction and operation. Most importantly, it is extremely efficient and cost effective in reducing noise and air pollution from internal combustion engines.

Two embodiments of the invention have been described herein, one of cylindrical cross-section and another of elliptical cross-section. However, many variations of the invention will be apparent to those skilled in the art. Accordingly, it is intended that the scope of the invention be limited only by the claims which follow.

What is claimed is:

1. Apparatus for controlling emissions from an internal combustion engine comprising:

an enclosed cylindrical housing a single inlet, said inlet being provided at one end of said housing for connection with said exhaust of said internal combustion engine, said housing also being provided with an outlet for eventual discharge of said exhaust gases, said housing being divided by at least two partitions into a first chamber adjacent said inlet, a second chamber adjacent said first chamber and a third chamber adjacent said second chamber;

a honeycomb catalytic cell of annular cross section coaxially disposed in said second chamber; and a tubular member coaxially disposed in said housing extending, uninterrupted, through said first and second chambers and the center of said catalytic cell into said third chamber, exhaust gases from said internal combustion engine flowing through said inlet being uninterrupted and totally confined within said tubular member until exiting and expanding into said third chamber, then through said catalytic cell for conversion of nitrogen oxides, carbon monoxide and unburned hydrocarbons to less noxious components and into said first chamber for eventual discharge through said outlet all without introduction of outside air.

2. Emission control apparatus as set forth in claim 1 in which said housing is of elliptical cross-section, said catalytic cell being of coaxial elliptical annular cross-section.

3. Emission control apparatus as set forth in claim 2 in which said tubular member is also of elliptic cross-section.

4. Emission control apparatus as set forth in claim 1 in which the walls of the end of said tubular member which extends into said third chamber tubular are perforated, allowing some of said exhaust gases to enter or exit said tubular member therethrough.

5. Emission control apparatus as set forth in claim 1 including at least two additional tubular members disposed in said housing radially outward from and on opposite sides of said first mentioned tubular member passing through said first and second partitions for flow of said exhaust gases of less noxious components for discharge through said outlet.

6. Emission control apparatus as set forth in claim 5 in which at least one end of at least one of said additional tubular members is perforated for reduction of noise in said apparatus.

7. Apparatus for controlling exhaust gas emissions from the exhaust of an internal combustion engine comprising:

an enclosed cylindrical housing having a single inlet at one end thereof for connection with said exhaust of said internal combustion engine and an outlet at the opposite end thereof, said housing being divided, from said one end toward said opposite end, by first, second and third partitions into first, second, third and fourth chambers;

a first tubular member of uniform diameter coaxially disposed in said housing extending from said inlet through said first and second chambers and into said third chamber providing for uninterrupted, totally confined flow of exhaust gases from said engine through said first tubular member until exiting into said third chamber for expansion therein;

a catalytic cell disposed in said second chamber surrounding said first tubular member and through which exhaust gases from said third chamber must flow, without addition of air or oxygen thereto, converting nitrogen oxides, carbon monoxide and unburned hydrocarbons to less noxious components for flow into said first chamber; and at least two additional tubular members on opposite sides of said catalytic cell disposed near outer walls of said housing extending through said first, second and third partitions and through said second and third chambers providing for flow of said exhaust gases of less noxious components from said first chamber into said fourth chamber for discharge through said outlet.

8. Emission control apparatus as set forth in claim 7 in which said housing forms an elliptical cylinder, said catalytic cell being of coaxial elliptic annular cross-section.

9. Emission control apparatus as set forth in claim 8 in which said first tubular member is also of elliptic cross-section.

10. Emission control apparatus as set forth in claim 7 in which said first tubular member extends into said third chamber, the walls of the portion of said first tubular member which extends into said third chamber having perforations therethrough to aid in expansion of exhaust gases and in reduction of noise through said apparatus.

11. Emission control apparatus as set forth in claim 7 in which opposite ends of each of additional tubular members also extend into said first and fourth chambers, respectively, both ends of each of said one or more additional tubular members being open and the walls thereof perforated for reduction of noise as said exhaust gas of less noxious components flow therethrough for eventual discharge through said outlet.

12. Emission control apparatus as set forth in claim 7 in which said second partition and third partition prevent flow from said third chamber to first chamber other than through said catalytic cell in traveling from said inlet toward said outlet.

13. Emission control apparatus as set forth in claim 12 in which said additional tubular members provide the only flow path of said exhaust gases from said first chamber to said fourth chamber for eventual discharge through said outlet.

14. Emission control apparatus as set forth in claim 7 in which the walls of one or more of said additional tubular members are perforated, allowing some of said exhaust gases to enter or exit said additional tubular member therethrough and reducing noise through said apparatus.

* * * * *